W. H. SPENCER.
WARP STOP MOTION FOR LOOMS.
APPLICATION FILED MAR. 21, 1911.
1,015,593.
Patented Jan. 23, 1912.
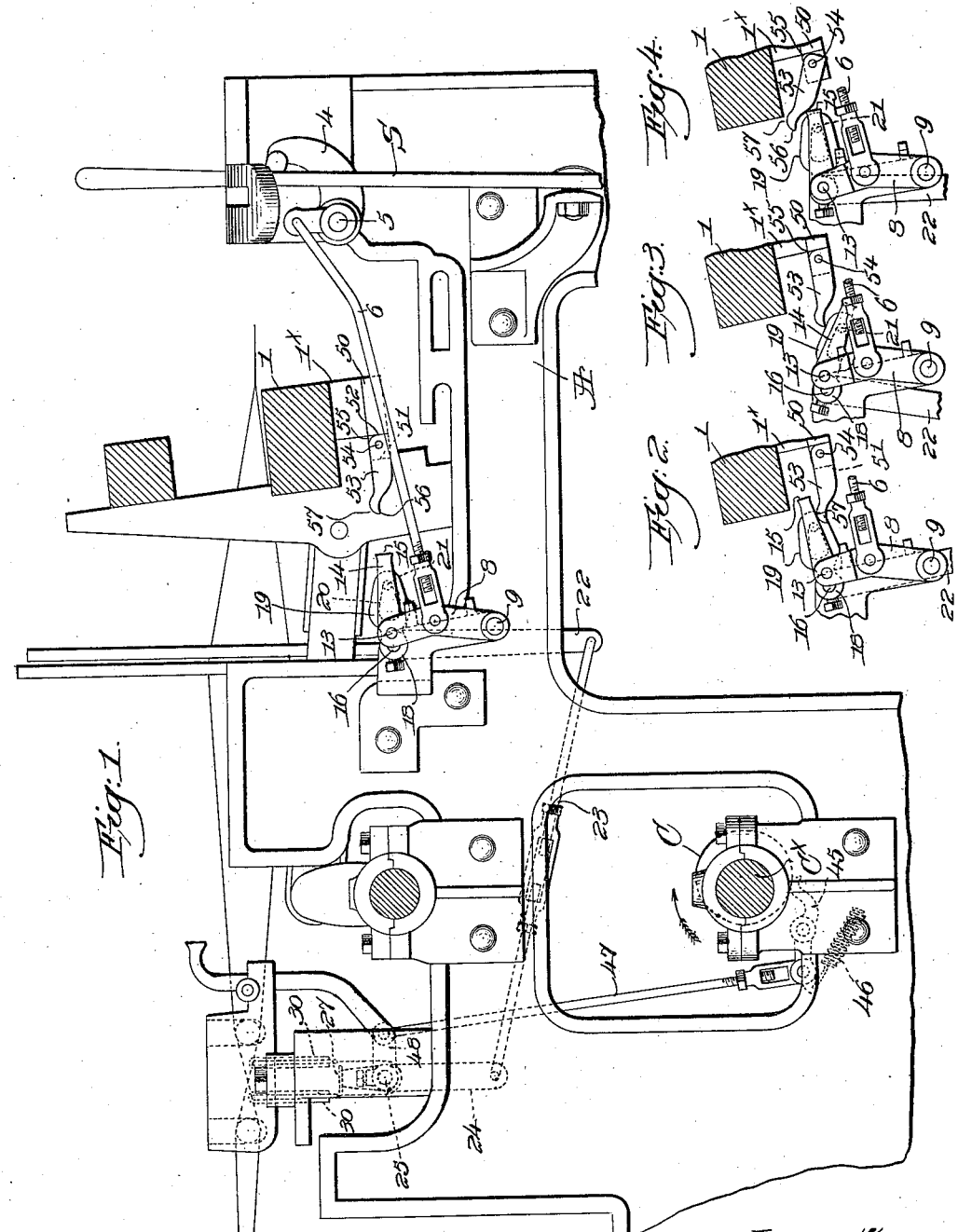

UNITED STATES PATENT OFFICE.

WILLIAM H. SPENCER, OF WATERVILLE, MAINE, ASSIGNOR TO DRAPER COMPANY, OF HOPEDALE, MASSACHUSETTS, A CORPORATION OF MAINE.

WARP STOP-MOTION FOR LOOMS.

1,015,593.  Specification of Letters Patent.  Patented Jan. 23, 1912.

Application filed March 21, 1911. Serial No. 615,943.

*To all whom it may concern:*

Be it known that I, WILLIAM H. SPENCER, a citizen of the United States, and resident of Waterville, county of Kennebec, State of Maine, have invented an Improvement in Warp Stop-Motions for Looms, of which the following description, in connection with the accompanying drawing, is a specification, like characters on the drawing representing like parts.

This invention relates to warp stop-motions for looms more particularly of the type shown in United States Patent No. 885,130 granted April 21, 1908, to Ambler, wherein shipper-release is effected on the backward stroke of the lay when a detector is released by failure of its warp-thread. In said patent a dog is pivotally mounted on a swinging carrier forming a part of the shipper-releasing means, and this dog is moved by a governor into the path of a bunter on the lay when a warp-thread fails and out of such path when the warp-threads remain intact. Such movement of the governor is effected by a normally vibrating feeler, adapted to be arrested by engagement with a released detector, and the bunter is a rigid lip or projection carried by the lay. In the patented structure, in actual practice, sometimes the coöperation of the dog and bunter operates not only to release the shipper but to cause the feeler to exert serious pressure upon the released detector, tending to injure the latter, such action being due to some slight mis-adjustment of the parts or to the looseness or lost-motion commonly found in loom structures, and as the dog is notched it must remain in engagement with the bunter fixedly mounted on the lay throughout the movement of the lay after such engagement is effected.

My present invention is an improvement on the Ambler device whereby I obviate the trouble before mentioned, and I also prevent any partial or incomplete engagement between the dog and bunter which in the patented structure occurs if the dog just fails to clear the bunter at a time when shipper-release is uncalled for.

The novel features of my invention will be fully described in the subjoined specification and particularly pointed out in the following claims.

I have shown my invention in connection with a loom provided with a major portion of the stop-motion shown and described in the Ambler patent.

Figure 1 is a left hand side elevation of a portion of a loom and the warp stop-motion therefor with my present invention embodied therein, the lay, crank and cam shafts being shown in section; Fig. 2 is a detail in side elevation showing the dog above the bunter path; Fig. 3 is a similar view, but with the dog below the bunter path; Fig. 4 is a view in elevation of such parts just after the bunter has disengaged itself from the dog after temporary engagement therewith of sufficient duration to effect shipper release.

The lay 1, shipper S, knock-off lever 4 fulcrumed at 5 on the loom side A and connected by link 6 with the upturned carrier 8 fulcrumed at its lower end on a fixed stud 9; and the forwardly extended dog 14 pivoted at 13 on the carrier, may be and are all as in the Ambler patent, except that herein the impact face 15 of the dog is flat, instead of being notched. So, too, the rock-shaft 16 having fast thereon the hub 18 of the governor 19 longitudinally slotted at 20 to receive loosely a lateral lug 21 on the dog adjacent and parallel to the governor, and the depending arm 22 fast on the rock-shaft, are as in said patent, the raising or lowering of the governor elevating or depressing the dog above or below the path of the bunter, to be described, and if the shipper is to be released the governor positions the dog 14 directly in the bunter path, so that as the lay swings back the bunter will engage the dog and move it rearward, swinging the carrier 8 on its fulcrum. Such swinging movement of the carrier acts through link 6 and the knock-off lever to release the shipper, and at such time the pin 21 slides rearward in the slot 20 of the governor.

A casting 50 fixedly attached to a depending part 1$^x$ of the lay has a rearward extension 51 beyond an upright shoulder 52, and on said extension the bunter 53 is pivoted on a horizontal pin 54, the front end of the bunter being rounded at 55 to permit the bunter to swing upward at times on its pivot. The straight end of said bunter below its pivot abuts against the shoulder 52, however, when the bunter is in normal position, Figs. 1, 2 and 3, to thereby prevent any further downward swing. As shown the pivot 54 is near the top of the bunter, so that it can swing upward readily, after it has temporarily engaged the dog when the latter is set for such engagement. In side elevation the bunter is shaped somewhat like a hawk-bill, having a straight, rather sharp impact edge 56 and a convexed surface 57 above and extending forward from said edge.

When the dog 14 is positioned with its plane face 15 in the path of the bunter on the back stroke of the lay the edge 56 impinges upon the face 15 and moves the dog rearward, as in the Ambler patented structure, far enough to operate the shipper-releasing means but the swing of the lay and the rearward movement of the dog then brings the impact edge 56 above the bunter pivot 54 and the bunter is swung upward and out of operative engagement with the dog as the lay completes its back stroke, as shown in Fig. 4. Such disengagement of course frees the dog, which has then performed its function, from any further control by the bunter, and there is no possible chance for the dog to effect any improper movement of the governor 19 tending to crush or damage a released detector.

Should the dog be moved up out of the direct path of the bunter, but not completely, through some faulty action of the mechanism, the end 15 of the dog will engage and slide up over the convexed surface 57 of the bunter, see Fig. 2, so that no rearward movement of the dog will be effected by such partial engagement at a time when shipper release is uncalled for. With a bunter fixed on the lay, and the dog notched at its end, a partial engagement of said parts, even when accidental, will effect shipper release and is likely to cause damage to other parts of the mechanism.

The means by which rocking movement of the governor 19 is effected will be briefly described, as they form no part of my invention and are as shown in the Ambler patent.

The arm 22 depending from the rock-shaft 16, Fig. 1, is connected by a link 23 with an arm 24 fast on and depending from the feeler rock-shaft 25, having a connected feeler 27, which is normally vibrated below the lower ends of two banks of detectors 30, each detector being suspended from a single warp-thread in well known manner. As the rock-shaft 25 is oscillated the rock-shaft 16 will be oscillated in unison therewith, and the governor 19 will be raised and lowered alternately, so that on one pick the dog 14 will be raised above the bunter 53 and on the next pick it will pass under it, as in Fig. 3, provided no warp fault occurs.

When a warp-thread fails its detector 30 drops into the path of and arrests the feeler 27 and through the described devices the dog 14 will be positioned for engagement by the impact edge 56 of the bunter, to effect shipper release as has been described. The immediately following release of the dog by the bunter prevents any possibility of the transmission of strain from the governor 19 to the released detector, by the positive connections between the governor and feeler, so that any chance of injury to the released detector is eliminated.

To vibrate the feeler 27 the cam shaft $C^x$, Fig. 1, has a cam C fast thereon coöperating with a pivoted follower 45 held by spring 46 against the cam and connected by a link 47 to an arm 48 operatively and yieldingly connected with the feeler rock-shaft 25, as in the Ambler patent, the up and down movement of link 47 normally acting to oscillate said shaft 25 and vibrate the feeler 27. No further description of this part of the mechanism is necessary, as it is the same as is shown and described in the patent above referred to.

Having fully described my invention, what I claim as new and desire to secure by Letters Patent is:

1. In a loom, in combination, a shipper, a knock-off lever therefor, a swinging carrier and a link connecting it with said lever, a dog pivoted on the carrier, the lay, a bunter pivotally mounted thereon to at times coöperate with the dog on the back stroke of the lay and swing the carrier, said bunter normally maintaining a fixed position on and relative to the lay and swinging on its pivot out of operative engagement with the dog after impact thereupon, the swinging movement of the carrier by such coöperation of the dog and bunter operating the knock-off lever to release the shipper, stop-motion detectors, a vibrating feeler to engage and be arrested by a detector released by failure of a warp-thread, a rocking governor in sliding engagement with the dog, and connections between the feeler and governor to rock and position the latter according to the position of the feeler, said governor normally moving the dog out of the bunter path and positioning the dog for engagement by the bunter when the feeler is arrested, the disengagement of the bunter and dog by pivotal movement of the former preventing the feeler from exerting undue pressure upon the released detector by transmission through the connections between the feeler and the governor.

2. In a loom, in combination, a shipper, a knock-off lever therefor, a swinging carrier and a link connecting it with said lever, a dog pivoted on the carrier, the lay, a bunter pivotally mounted on the lay and rearwardly extended therefrom, a stop to limit downward movement of and maintain said bunter normally fixed with relation to the lay and in operative position for temporary engagement with the dog on the backward stroke of the lay, to swing the carrier, the bunter thereafter rising on its pivot out of operative engagement with the dog, the latter having a flat impact face, swinging movement of the carrier acting through the knock-off lever to release the shipper, a rocking governor in engagement with the dog, to move the latter into and out of the normal path of movement of the bunter, and means, including a vibrating member arrested by or through failure of a warp-thread, to rock the governor and move the dog out of the bunter path except when said vibrating member is arrested.

In testimony whereof, I have signed my name to this specification, in the presence of two subscribing witnesses.

WILLIAM H. SPENCER.

Witnesses:
 MELVIN L. STONE,
 F. W. CLAIR.

Copies of this patent may be obtained for five cents each, by addressing the "Commissioner of Patents. Washington, D. C."